United States Patent [19]
Quittner

[11] 3,737,663
[45] June 5, 1973

[54] RADIATION PATH TERMINATION HOUSING

[76] Inventor: George F. Quittner, 1780 Cumberland Road, Cleveland, Ohio 44118

[22] Filed: Mar. 15, 1972

[21] Appl. No.: 234,981

Related U.S. Application Data

[63] Continuation-in-part of Ser. No. 68,330, Aug. 31, 1970, abandoned.

[52] U.S. Cl.............................250/83.3 H, 250/218
[51] Int. Cl..............................................G01n 21/26
[58] Field of Search....................73/355 R; 250/218, 250/83.3 H

[56] References Cited

UNITED STATES PATENTS

| | | | |
|---|---|---|---|
| 2,814,953 | 12/1957 | Callaghan | 73/355 R |
| 2,042,095 | 5/1936 | Grant | 250/218 |
| 3,609,382 | 9/1971 | Moore | 250/218 |
| 3,307,447 | 3/1967 | Carleton et al. | 250/218 |

Primary Examiner—James W. Lawrence
Assistant Examiner—Harold A. Dixon
Attorney—George V. Woodling, Bruce B. Krost, Louis V. Granger et al.

[57] ABSTRACT

Disclosure of a housing for both the transmitting and receiving transducers of opto-electronic systems. Clean compressed air is released in a passage between the transducer and the bulk of the light path at sufficient axial velocity to keep the transducer's radiation transmissive surface clean. A filter may be used between the transducer and the pneumatic entrance orifice, whose transmissive surface is also protected by the same axial air velocity, but which can easily be replaced if, in long term use, it accumulates condensates and other vestigial contamination of the supplied, filtered air. The housing also serves to make the transuducer more robust.

17 Claims, 2 Drawing Figures

RADIATION PATH TERMINATION HOUSING

This case is a continuation-in-part of my application Ser. No. 68,330 filed Aug. 31, 1970, entitled Radiation Path Termination Housing now abandoned.

BACKGROUND OF THE INVENTION

My co-pending application, Ser. No. 170,570, discloses photoelectric equipment which is unaffected by ambient light to avoid one of the problems which limit the application of photoelectric systems. Its adaptability to solid state transducers also avoids the problem of limited transducer life, another such limitation. Another such problem which limits their application is the tendency of their radiation transmissive surfaces to become dirty over a period of time. Since this condition gradually alters the electrical level threshold to which they should be adjusted to produce useful output signals, and ultimately causes them to cease to function until cleaned, it is justified to describe these surfaces as "critical." The idea of using clean compressed air, or water, to continuously wash the critical surfaces is not new, but it is seldomly used because of its cost.

According to my invention, taking advantage of only recently available solid state transducers which economically produce and sense small diameter beams, a relatively long, small diameter orifice is placed immediately ahead of the transducer, with its critical radiation transmissive surface, of course, facing the path through the orifice, and the fluid is introduced at the rear or inner end of the orifice. The fluid thus acquires a high outward velocity compared to that which the same hourly consumption of fluid could produce in an orifice wide enough to accommodate larger diameter radiation paths. The high outward velocity expels dirt which otherwise would accumulate on the critical surface. An easily replaceable filter located between the critical surface and the inner portion of the orifice may be added to protect the critical surface from vestigial impurities in the fluid. The invention is equally useful in coaxial, reflective radiation systems having both transducers within the same housing, and according to my invention behind the same narrow diameter, relatively elongated orifice, and in this embodiment fluid consumption is further limited by having only one orifice for both transducers.

An object of my invention is therefor to provide economical means for keeping radiation transmissive surfaces clean. Another object is to minimize the rate of fluid consumption required to keep the critical surface(s) clean. Another object is to provide means to keep even vestigial impurities from long term build-up on the critical surface(s). Other objects will be apparent upon consideration of the accompanying drawings and specification.

SUMMARY OF THE INVENTION

The invention may be incorporated in a housing for an electromagnetic radiation path termination and an electric circuit termination, comprising in combination, a chamber for an opto-electric device, having an opening for electric connections to an electric circuit, wall means defining an orifice, capable of conducting both electromagnetic radiation and a fluid, having inner and outer portions, with the inner portion leading to said chamber, and connection means for a fluid supply, connected to said inner portion of said orifice.

DESCRIPTION OF THE PREFERRED EMBODIMENT

Figure 1:
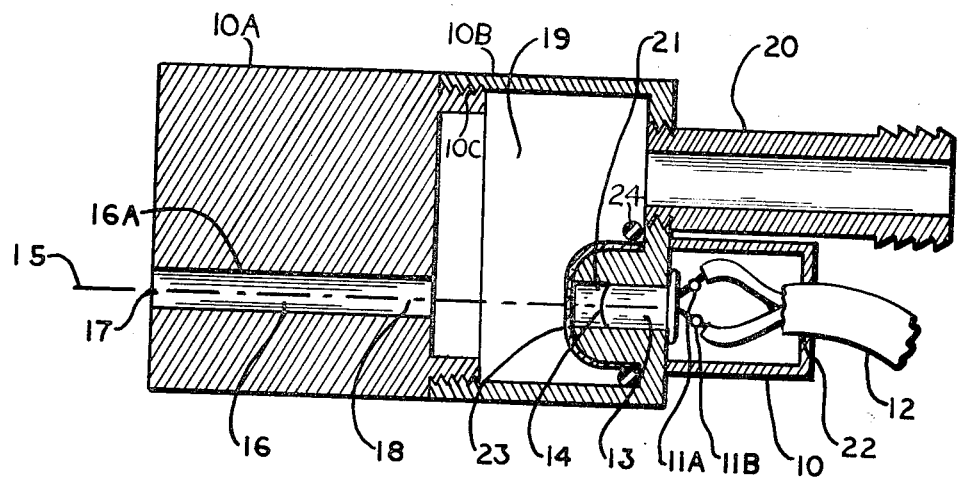
FIG. 1 shows a cross section of a preferred embodiment of my invention, except for the transducer and connecting wires, which are shown in elevation.

In FIG. 1 is shown a housing 10 enclosing electrical circuit terminations 11a and 11b for an entering electrical cable 12, and an opto-electric transducer 13 whose radiation transmissive, critical front surface 14 terminates nominally a radiation path 15. Depending upon whether transducer 13 is selected to be a radiation emitter or sensor, path 15 is respectively an exiting or entering path for radiation.

An orifice wall 16A defining an orifice 16 is provided which can conduct radiation and fluid in either direction simultaneously, and orifice 16 has an outer portion 17, farther from the transducer and closer to the ambient, and an inner portion 18, closer to the transducer and farther from the ambient. A connection 19 is provided to the inner portion 18 of orifice 16 for the introduction of a fluid supply under greater pressure than the ambient, through tubing 20. The housing 10 is formed conveniently in two parts 10A and 10B, fastened together in any suitable manner, such as screws and nuts, or by the threaded connection 10C, shown.

A chamber 21 is provided, having an opening to the inner portion 18 of orifice 16, in which the transducer 13 is positioned, and an opening 22 through which electrical connection cable 12 enters to permit electrical terminations 11a and 11b to be made. A filter 23 may be provided which is transmissive of radiation but substantially impermeable to fluid, located in the transmission path 15 and adjacent the inner portion 18 of orifice 16, between the point of fluid introduction through connection 19 and the critical surface 14 to be kept clean. The filter 23 may be flat, but in this embodiment is cup-shaped. It may be sealed to the housing 10 in any suitable manner, as by the elastic ring 24.

In operation, clean fluid is introduced via tubing 20 through connection 19. Since it cannot flow through impermeable filter 23 or, in the absence of filter 23, through radiation transmissive surface 14, it flows through orifice 16 and its outer portion 17 where it diffuses into the ambient. The axial length of orifice 16 along radiation path 15 is preferably made longer than its diameter, so that particles of dirt which, in the ambient are moving toward critical radiation transmissive surface 14, must pass through a relatively extended distance wherein the fluid is moving in the opposite direction at a relatively high velocity to assure its expulsion and failure to deposit on critical surface 14 or on filter 23. Of course, this passage length may be made shorter or longer depending on the air velocity provided by the pressure available and the inward moving velocity and momenta of dirt particles to be expelled. Further, the diameter of passage 16, 18 will be made as small as possible without vignetting significantly the radiation path to or from transducer 13, since air consumption is thus conserved.

The filter 23, while clearly not absolutely essential to carry out the spirit and purpose of my invention, nevertheless can be advantageous to avoid certain possible contingencies and possible residual problems. For example, compressed air, the typical fluid contemplated for use in my invention, is an expensive utility, and some care in its expenditure is generally desirable. Excessive zeal in air conservation might provide relatively low velocity in orifice 16, so that a few dirtying particles might succeed in reaching the critical surface 14. Further, since it is not economical to provide chemically pure air as a general industrial utility, ordinary air filtration removes most suspended dirt and oil quite well, while an ordinary separator will remove condensibles, which are in the utility air as vapor rather than discrete particles, which have condensed at the temperature of the tubing and separator. However, from time to time the critical surface 14 might be somewhat cooler than the separator and thus condense and collect a film of radiation attenuating material. Further, utilities such as compressed air occasionally fail to be pressurized for relatively short periods of time, during which dirt might achieve entry through orifice 16 to deposit on critical surface 14. For such reasons, filter 23 can be useful. Usable filter materials include regenerated cellulose, polyvinyl chloride film, glass, etc.

Figure 2:
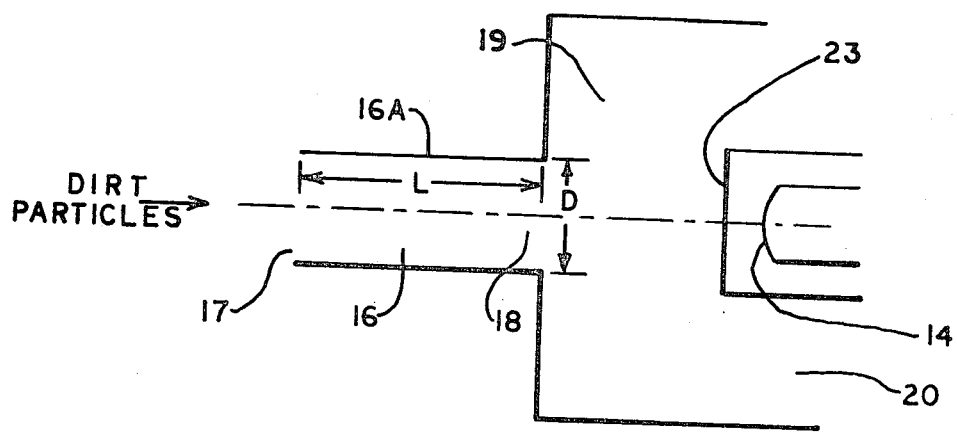
FIG. 2 is a schematic diagram of a portion of my invention, used to aid in explaining its operation and to help distinguish it from old art.

Referring now to FIG. 2, where some of the essential elements of my invention are shown schematically for explanatory purposes, and corresponding elements are numbered the same as they are in FIG. 1, an arrow at the left side of the figure marked "dirt particles" indicates that the main (and most difficult to expel) source of the dirt particles which my invention is intended to keep off critical surface 14 is the ambient air outside orifice outer portion 17. Typically such particles include airborn dust, airborn particles of material from grinding wheels and material being ground by grinding wheels, airborn droplets of lubricating and/or cutting oils or water, and the like. Some such particles which happen to be aimed at orifice 16 are massive (relatively large and much heavier than air) and may have been launched on these trajectories by rapidly rotating metal working tools and other machinery, or might be (for another example) misdirected waste paint particles from a paint spray gun, etc. Common dust particles usually are smaller and therefore less massive and generally are gently wafted about by random air currents; they generally have much lower momenta and velocity. The latter kind of particles easily can be kept out of orifice 16 (and passages 16–18) by relatively low exiting fluid velocity. More massive and momentous particles are kept out of orifice 16 by two operational mechanisms; those particles approaching from directions not close to radiation axis 15 tend to have their paths deflected by the fluid streaming out of orifice 16 and altered to non-entering paths (that is, they are turned aside). Such massive particles as do actually enter orifice 16 are now immersed in fluid moving in the opposite direction. For those particles, even though their relative to the air exiting may continue dropping only relatively slowly due to fluid friction, their velocity relative to orifice 16 can be abruptly lowered and reversed, causing them to be expelled before they can reach critical surface 14 or even the inner portion 18 of the orifice 16. If some particles are merely slowed until they drop to the bottom of orifice wall 16A, the velocity in the channel assures that before the pile is high enough to obscure the radiation passage, the top will be blown outward off the pile. The effectiveness of my invention thus can be regarded as having two aspects; (1) a first aspect keeps many particles from ever entering orifice 16, while (2) a second aspect expels particles which do actually enter orifice 16.

For this first aspect of effectiveness of my invention the length L in FIG. 2 has relatively little importance and it is only necessary that the fluid (generally air) emitted from orifice 16 have as high velocity as needed for the second aspect. For the second aspect, however, a period of time is needed for the friction of the outward rushing fluid surrounding a particle to absorb the particle's momentum and accelerate it outwardly, the time required to do this work is inversely proportional to the square of the fluid velocity in orifice 16, while the time provided is directly proportional to length 1 and inversely proportional to that velocity. Even for the second aspect, high velocity of fluid leaving orifice 16 tends to slow the inward motion of orifice-bound particles before they actually reach the mouth 17 of the orifice, so that the remaining task of reversing the particle's movement within orifice 16 is substantially decreased.

It is thus seen that velocity of fluid in orifice 16, and in front of orifice mouth 17, is the key variable in skillfully practicing my invention. This location of the maximum velocity is distinctly and uniquely different from prior art, which in various cases provides maximum velocity (1) at jets or air passages whose axes are not coaxial with the radiation, (2) at jets causing wiping impingement of the protective fluid on the critical radiation transmissive surface, or (3) at jets causing a secondary turbulence or vortex which is supposed to keep the critical surface from being contaminated. My arrangement has the advantage of preventing foreign matter from ever approaching the critical surface, over prior art schemes which attempt to wipe the offensive material off, one way or another, after it has approached.

Compressed air is the most expensive of common industrial plant utility services. Thus, prior art schemes have not found wide utility because they do not conserve this expensive utility, even in cases where they may have been effective. But prior art schemes could not have become practical in this regard even if they had included my invention. This is because only recently has the state of the art of manufacturing radiation sources and sensors progressed to the state where a general use apparatus could be produced as an article of commerce, manufactured serially instead of at high cost as a custom design, having a small enough radiation path diameter to usefully use only economical quantities of air.

For example, I prefer (referring again to FIG. 2) an orifice diameter *d* of approximately 3 mm, and an orifice length L of approximately 12 mm. Heretofor available transducers could not economically have operated with mere 3 mm orifice diameters, whereas modern phototransistors, thermistors, light emitting diodes and so forth can usefully operate with such small diameter radiation apertures. By applying an indicated pressure of 0.14 $Kg/cm^2$ I achieve a fluid velocity of approximately 18 cm/min. while consuming only about 5 cc/min. of air. I find that this low consumption of air is sufficient to keep the equipment clean except in extremely unusual circumstances. Of course, in the latter case, the pressure can be increased, resulting in correspondingly increased velocity, and capability to keep out dirt. Even so, the air consumption hardly exceeds that of a small, typical leak at, for example, the stem of a standard globe valve, or condensate removal valve.

In FIG. 2 the means 20 of conducting fluid to orifice 16 is shown in a very undetailed way. It is an integral and important object of my invention to minimize the quantity and cost of the fluid used to keep critical surface 14 and filter surface 23 clean. The cost of the fluid (typically and preferably compressed air) is proportional to the quantity (volume) used, measured at standard conditions, according to generally accepted engineering and accounting practices. Gases are easily compressible, so that at a typical indicated pressure for an industrial plant compressed air utility of 60 psig (4.2 kg/cm$^2$), the absolute pressure being approximately 75 psig (5.3 Kg/cm$^2$), the volume of a cubic centimeter of air is approximately one-fifth of its volume at standard atmospheric pressure. At the indicated pressure of 0.14 kg/cm$^2$ discussed above as the typical preferred input pressure to my invention, which is very close to atmospheric pressure, air has nearly its standard volume. If in actual apparatus design (as in FIG. 1) one would constrict passage 20 or passage 19 with the prior art objectives of creating a "vortex" or creating a relatively high fluid velocity at (as distinguished from in a channel in front of) critical radiation passing surfaces 14 and 23, the total pressure drop between the pressure in supply conduit 20 and ambient pressure would be increased thereby in comparison to the pressure drop produced in traversing orifice 16 alone while maintaining sufficient fluid velocity to keep orifice 16 and critical surfaces 14 and 23 clean. But such increased pressure drop would mean increased air compression costs, thus reducing the advantages obtained by my invention without at all enhancing its effectiveness.

Therefore, I prefer that the fluid connection 19, see FIG. 1, be made larger in diameter than the orifice 16. This establishes that the orifice 16 provides the greatest restriction to fluid flow in the housing subsequent to the inlet tube 20. This also establishes that the fluid flow in the orifice 16 is at the highest velocity of any part of the housing subsequent to the fluid inlet tube 20. My invention's effectiveness depends, as stated above, on achieving satisfactory fluid velocity in, as well as at the atmospheric pressure end 17 of, orifice 16.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A housing for an electromagnetic radiation path termination and an electric circuit termination, comprising in combination,
    a chamber within said housing for retaining an optoelectric device, having an opening for electric connections to an electric circuit,
    wall means defining an orifice with an axis, capable of conducting both electromagnetic radiation and a fluid, having inner and outer portions, with the inner portion leading axially to said chamber,
    an inlet conduit connected to said housing for a fluid supply thereto, said housing having a passage for fluid flow connected from said inlet conduit to said inner portion of said orifice,
    and said orifice being the greatest restriction to fluid flow in the housing subsequent to said inlet conduit for highest velocity in said orifice.

2. The housing as set forth in claim 1, further characterized by said chamber opening to said inner portion of said orifice containing a filter substantially impermeable to passage of fluid and substantially permeable to passage of electromagnetic radiation.

3. The housing of claim 2, further characterized by fluid flow outwardly of said orifice and being at a velocity sufficient to decrease contamination of said filter by dirt and the like entering the orifice.

4. The housing as set forth in claim 2, further characterized by said orifice having an axial length greater than its diameter.

5. The housing as set forth in claim 4, further characterized by an easily removable cup-shaped filter.

6. The housing as set forth in claim 2, including mounting the filter directly in the housing.

7. The housing as set forth in claim 1, further characterized by said orifice having an axial length greater than its diameter.

8. The housing of claim 1, further characterized by fluid flow through a majority of the length of said orifice.

9. A housing as set forth in claim 1, including said passage being an enlarged passage between the inner portion of said orifice and said device chamber,
    said inlet conduit being connected for fluid flow through said enlarged passage to said inner portion of said orifice,
    and said inlet conduit having a cross-sectional area less than that of said enlarged passage and greater than that of said orifice for a fluid flow pressure drop in said inlet conduit which is greater than that in said enlarged passage and less than that in said orifice.

10. The method of inhibiting the decrease of radiation due to contamination in a path to or from a radiation electrical transducer in a housing, comprising the steps of,
    providing an orifice with an axis in the housing with an inner and an outer portion and having openings solely on the axis,
    mounting the radiation electrical transducer in a chamber in the housing to permit passage of radiation to or from the transducer along a path defined by the orifice in the housing,
    providing a fluid inlet to said housing from a fluid supply,
    and directing a fluid stream through a part of said orifice in the housing with the fluid flow in the orifice being at the highest velocity of any part of the housing subsequent to the fluid inlet to the housing to aid in keeping contaminants away from the transducer.

11. The method as set forth in claim 10, including directing the fluid stream along a majority of the length of the orifice from the inner toward the outer portion.

12. The method as set forth in claim 10, including dimensioning the orifice to have a length from inner to outer portions greater than the width thereof.

13. The method as set forth in claim 12, including providing the fluid stream at a high velocity in said orifice to keep contaminants away from the transducer.

14. The method as set forth in claim 10, including providing a filter substantially pervious to the radiation and substantially impervious to the fluid positioned between the fluid stream and the radiation transducer.

15. The method as set forth in claim 14, including sealing the filter to the housing to prevent contaminants penetrating behind the filter toward the transducer.

16. The method as set forth in claim 10, including providing an enlarged passage in the housing between said orifice and said transducer chamber, and directing said fluid stream first through said enlarged passage and then said orifice to establish a larger fluid pressure drop in said orifice than in said enlarged passage.

17. A method of maintaining transparency to radiation of a critical surface in a radiation transducer housing comprising the steps of, providing a passage for radiation between the critical surface to be maintained transparent, and the ambient, between which said radiation is passed, said passage having a first outer portion adjacent to the ambient and a second inner portion nearer to said critical surface, a fluid conduit, connected to said second, inner portion to which fluid is supplied, said conduit being larger in diameter than said first outer portion to provide less pressure drop within said housing than said first outer portion, and supplying sufficient fluid to said second, inner portion so that fluid velocity in said first, outer portion is higher than the inward velocity of material which, in the absence of said fluid, would enter and obscure the critical surface.

* * * * *